United States Patent [19]
Lasich et al.

[11] 4,029,202
[45] June 14, 1977

[54] CONTAINER WITH PLASTIC CAP AND DISPLAY RACK THEREFORE

[75] Inventors: Lawrence E. Lasich, Twinsburg; Charles Tecco, Northfield, both of Ohio

[73] Assignee: Weatherchem Corporation, Twinsburg, Ohio

[22] Filed: May 26, 1976

[21] Appl. No.: 673,073

[52] U.S. Cl. .............................. 206/562; 206/486; 206/493; 206/526; 211/73; 220/375
[51] Int. Cl.² .......................................... B65D 1/36
[58] Field of Search ... 206/464, 478, 482, 485–487, 206/72, 593, 526; 220/375; 215/306; 229/93; 248/450; 211/60 R, 60 A, 73–75, 89; 222/543, 556, 563–565, 567

[56] References Cited
UNITED STATES PATENTS

| | | | |
|---|---|---|---|
| 2,043,070 | 6/1936 | Rutkowski | 206/482 |
| 2,720,969 | 10/1955 | Kendall | 206/72 UX |
| 2,826,343 | 3/1958 | Albiani | 222/498 X |
| 2,883,061 | 4/1959 | Moore | 206/72 |
| 3,031,111 | 4/1962 | Stull | 222/543 X |
| 3,860,135 | 1/1975 | Yung et al. | 215/306 X |

Primary Examiner—Stanley H. Tollberg
Assistant Examiner—David A. Scherbel
Attorney, Agent, or Firm—McNenny, Pearne, Gordon, Gail, Dickinson & Schiller

[57] ABSTRACT

A container comprising a fiber tube and a plastic end closure is shipped and displayed at the point of purchase in a display rack. A first end of the paper fiber tube is deformed radially inwardly to close the first end of the tube. The closed first end of the tube is provided with a longitudinally recessed center portion. The plastic end closure is disposed on the second end of the tube. The plastic end closure is structured and arranged so that it provides a smooth top surface having a recessed center portion. The display rack includes a plurality of cavities, and each cavity includes a resilient finger projecting into the cavity at each of its ends. The resilient fingers project into the recessed first end of the fiber tube and into the recessed center portion of the end closure on the second end of the tube to removably secure the container in the display rack.

12 Claims, 7 Drawing Figures

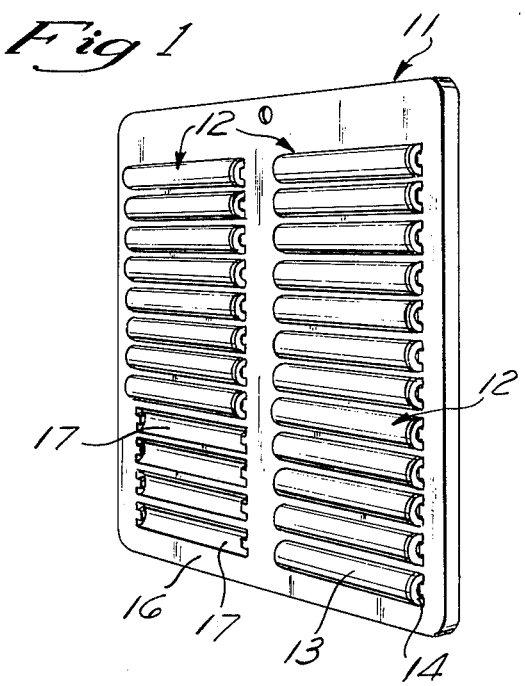
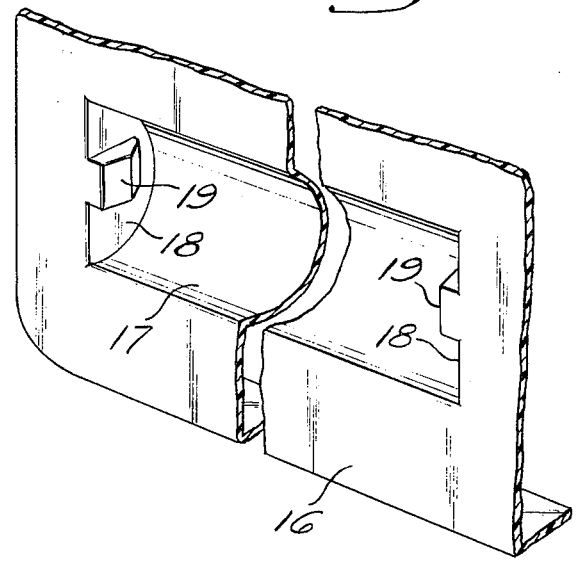
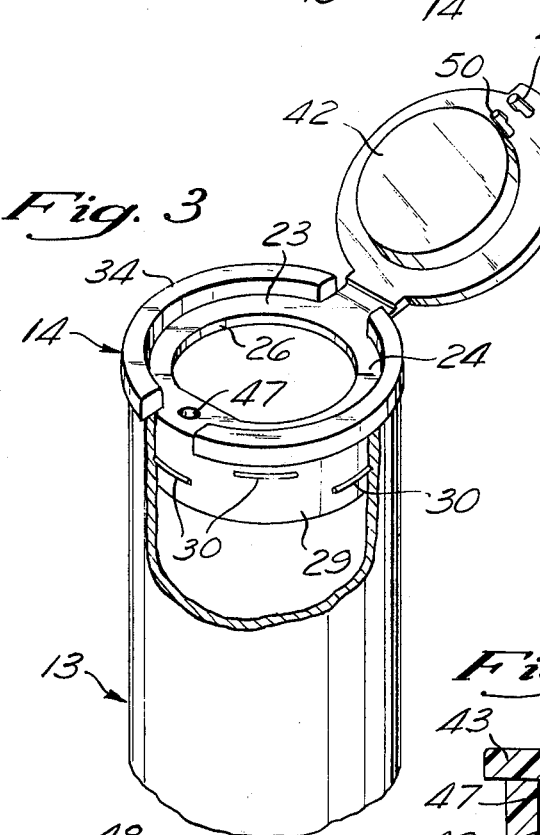
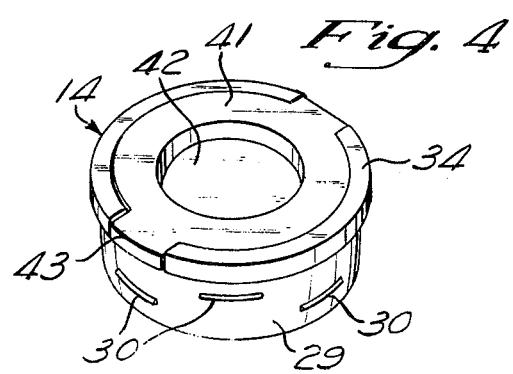
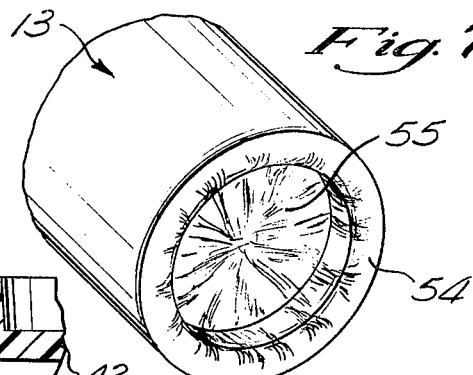
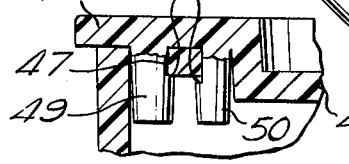
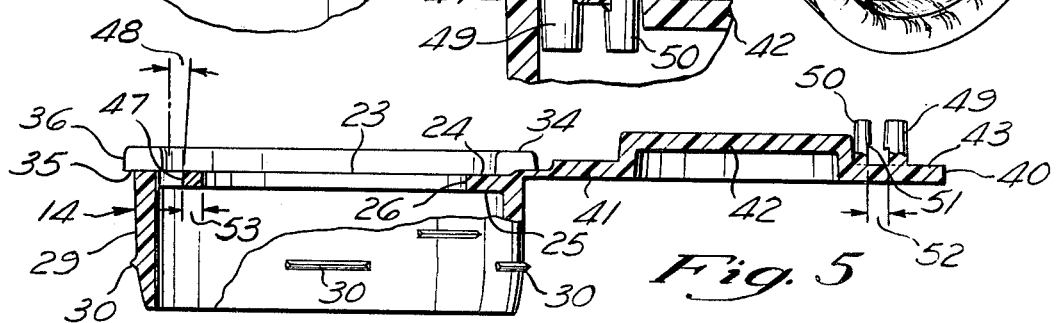

CONTAINER WITH PLASTIC CAP AND DISPLAY RACK THEREFORE

BACKGROUND OF THE INVENTION

The prior art has provided a wide variety of plastic end closures for containers. Two such prior art end closures are shown in U.S. Pat. Nos. 2,625,306 and 2,826,343. Each of these patents discloses a one-piece plastic end closure which has an annular base and a tab connected to the base for movement between an open and a closed position.

The present invention departs from these and other prior art end closures by providing a one-piece injection molded plastic end closure which, when used on a recessed closed end paper fiber tube in combination with a display rack, cooperates with the recessed closed end of the paper fiber tube to removably secure the container in the display rack during shipping and display at the point of purchase.

More specifically, the end closure includes a generally flat annular ring like base having a top wall and a bottom wall and a central opening through which the contents of the container may be dispensed. An annular skirt portion is connected to the bottom wall of the base and extends longitudinally away from the base for being received within the open end of the tube. An annular rib is connected to the top wall of the base and extends radially outwardly beyond the skirt portion so that the open end of the tube abuts the bottom wall of the rib and so that the outer wall of the rib is aligned with the outer wall of the tube. The annular rib is discontinued and interrupted at two radially opposite locations to divide the rib into two C-shaped portions.

A tab is connected by a reduced thickness hinge to the base at one of the interruptions in the rib. The tab is a disc shaped member and is disposed within the rib when the tab is in the closed position. The tab includes an annular portion seated on the base and a longitudinally recessed center portion extending into the opening of the base when the tab is in the closed position. The top wall of the rib and the top wall of the annular tab portion are disposed in a common plane to provide a smooth surface extending from the outer wall of the rib to the recessed center portion of the tab.

The display rack includes a display board and a plurality of open cavities in the display board. Each cavity has a resilient finger disposed at each of its ends. The resilient finger at one end of the cavity projects to the longitudinally recessed center portion of the closed end of the paper fiber tube, and the resilient finger at the other end of the cavity projects into the recessed center portion of the tab.

BRIEF DESCRIPTION OF THE DRAWINGS

These and other features and advantages of the invention will become more readily apparent from the description of the preferred embodiment of the invention shown in the drawings, wherein:

FIG. 1 is a perspective view of the plastic end closure and paper fiber tube and display rack in combination, with certain of the containers removed from the display rack as would occur at the point of sale for the containers;

FIG. 2 is an enlarged broken perspective view of one of the several identical cavities in the display rack shown in FIG. 1;

FIG. 3 is a perspective view of the top portion of one of the containers shown in FIG. 1, with the tab in an open position and with a portion of the paper fiber tube removed to show the details of the end closure;

FIG. 4 is a view similar to FIG. 3 but with the paper fiber tube omitted and with the tab shown in a closed position;

FIG. 5 is a cross sectional side elevational view of the end closure used on each of the containers shown in FIG. 1, with the tab in an open position;

FIG. 6 is a cross sectional side elevational view of a portion of the end closure used on each of the containers shown in FIG. 1, with the tab in a closed position; and FIG. 7 is a perspective view of the bottom of one of the several identical paper fiber tubes shown in FIG. 1.

DETAILED DESCRIPTION OF THE DRAWINGS

Referring now to the drawings in greater detail, FIG. 1 shows the combination of a display rack 11, and a plurality of identical containers 12 each of which includes a paper fiber tube 13 and a plastic end closure 14.

The display rack 11 is of one piece plastic construction and is preferably vacuum formed. The display rack 11 includes a display board 16 and a plurality of identical cavities 17. Each of the cavities 17 is constructed and arranged to receive one of the containers 12. Each cavity 17 includes opposite end walls 18, and each end wall 18 includes a resilient plastic finger 19 which projects into the cavity 17 and which is deformable during insertion and removal of its associated container.

Referring now to FIGS. 3 through 5, each end closure 14 is a one piece integral injection molded product preferably made of a relative soft polypropylene but alternatively made of polyethylene or any other suitable common polyolefin which may be readily selected by those skilled in the art. The end closures 14 are each molded in the open position shown in FIG. 5.

Each end closure 14 includes a generally flat annular ring like base 23. The base 23 has a longitudinally outwardly facing top wall 24, a longitudinally inwardly facing bottom wall 25, and a central opening 26 through which the contents of the container may be dispensed.

An annular skirt 29 depends longitudinally downwardly from the bottom wall 25 of the base 23. The outer cylindrical surface of the skirt 29 is provided with two rows of circumferentially spaced apart ribs 30. The top row of ribs is offset from the bottom row of ribs so that the ribs of the top row are not aligned longitudinally with the ribs of the bottom row. The free end of the skirt 29 remote from the base 23 has a tapered outer portion to facilitate insertion of the skirt 29 into the open end of the fiber tube 13. The skirt 29 may be pushed into the open end of the tube 13 either manually or by automatic machinery, and the skirt 29 is secured in place by the ribs 30. If desired, a suitable adhesive may be applied to the inside of the tube 13 or to the outer surface of the skirt 29 to adhesively secure the end closure 13 in place.

An annular rib 34 is disposed on the top wall 24 of the base 23. The annular rib 34 extends longitudinally outwardly from the base 23 in a direction opposite the direction in which the skirt portion 29 extends. The rib 34 also extends radially outwardly beyond the top wall 24 of the base 23 and beyond the skirt 29 to provide a bottom wall 35 which abuts the free end of the tube 13 when the end closure 14 is assembled on the tube 13. The rib 34 also includes a cylindrical outer wall 36 which is of the same diameter as the outer wall of the tube 13 so that the outer wall of the rib 36 is aligned with the outer wall of the tube 13. The rib 34 is discontinuous and interrupted at a first location on the base 23 and at a second location on the base 23 radially opposite the first location. This divides the rib 34 into two C-shaped or semicircular portions.

The end closure 14 also includes a tab 40 which is movable between an open position shown in FIGS. 3 and 5 and a closed position shown in FIG. 4. The tab 40 is connected to the base 23 at the first discontinuity in the rib 30 by a reduced thickness hinge portion. The tab 40 is a disc shaped member which includes an annular ring like portion 41. When the tab 40 is in its closed position, the annular portion 41 is seated on the top wall 24 of the base 23. The tab 40 also includes a longitudinally inwardly recessed center portion 42. When the tab 40 is in its closed position, the recessed center portion 42 extends into the dispensing opening 26 in the base 23. Additionally, when the tab 40 is in its closed position, the top wall of the annular portion 41 on the tab 40 is substantially coplanar with the top wall of the rib 34. This provides a substantially smooth uninterrupted end surface for the closure 14 extending from the outer wall 36 radially inwardly to the recessed center portion 42 about the entire circumferential extent of the end closure 14. Additionally, and particularly by the arrangement of the recessed center portion 42 of the tab 40 projecting into the dispensing opening 26 of the base 23, the end closure 14 is of very low profile so that it does not extensively add to the overall length of the container 12. The tab 40 also includes a lifting portion 43 which extends from the annular portion 41 radially outwardly at the location of the second discontinuity in the rib 34. The lifting portion 43 provides a convenient surface which may be pushed upwardly to open the tab 40 when the tab 40 is in its closed position.

Referring now to FIGS. 3, 5 and 6, the base 23 includes a passage 47 extending longitudinally therethrough at a location radially outwardly from the dispensing opening 26 and radially inwardly from the skirt portion 29. The radially innermost wall of the passage 29 is inclined at an angle 48 of approximately three degrees relative to the longitudinal axis of the container. The tab 40 includes two radially spaced locking pins 49 and 50 which project from the annular portion 41. The locking pins 49 and 50 are each undercut to provide a lip 51 which is disposed on the radially inner portion of the locking pin 49 and on the radially outer portion of the locking pin 50.

The straight line distance 52 between the locking pins 49 and 50 at the location of the undercuts 51 is less than the straight line distance 53 between the bottom of the radially innermost wall of the passage 47 and the bottom of the central dispensing opening 26. In this manner, when the tab 40 is rotated from its open position to its closed position so that the pin 49 enters the passage 47 and the pin 50 enters the central opening 26, the pins 49 and 50 resiliently squeeze the portion of the base 23 which is disposed between the pins. This assures that the undercuts or lips 51 will hold the tab 40 in its closed position until a strong upward force is exerted on the lifting portion 43 to reopen the tab 40.

Referring now to FIG. 7, the structure of the closed end of the fiber tube 13 is shown. The end of the fiber tube 13 which is to be closed is deformed in a well known manner to provide an outer peripheral portion 54 and a recessed center portion 55 which is spaced longitudinally inwardly from the outer peripheral portion 54. The deformed portion of the tube 13 which forms the recessed center portion 55 is of integral construction with the remaining portions of the tube 13 and is compressed to form a rigid closed end for the bottom of the tube 13. Such closed end fiber tubes are commercially available and are used by Daisy Division of Victor Comptometer Corporation of Rogers, Arkansas.

When the container 12 having the end closure 14 affixed to the open end of the fiber tube 13 is to be mounted on the display board 16, it is aligned with one of the cavities 17. The container 12 is then pushed into the cavity 17, deflecting one or both fingers 19 because the straight line distance between the fingers 19 is less than the straight line distance from the top wall of the rib 34 to the bottom wall of the outer peripheral portion 54. When the container 12 is fully received in the cavity 17, the finger 19 at one end of the cavity projects into the recessed center portion 42 of the end closure 14, and the finger 19 at the other end of the cavity projects into the recessed center portion 55 of the fiber tube 13. This secures the container in place during shipping and during display at the point of purchase.

What is claimed:

1. In combination, a paper fiber tube, a plastic end closure, and a display rack; said paper fiber tube being a longitudinally extending tube of cylindrical lateral cross sectional configuration and having an inner wall and an outer wall and a first end and a second end, said first end being closed, and said first end having an outer peripheral portion and a longitudinally inwardly recessed center portion spaced longitudinally inwardly from said outer peripheral portion; said plastic end closure being of one-piece construction and including a generally flat annular base, said base having a top wall and a bottom wall, an annular skirt portion connected to said bottom wall of said base and extending longitudinally away from said base, said skirt portion being received within said second end of said tube, a tab movable between an open position and a closed position, said tab being hingedly connected to said base, said tab being a generally disc shaped member, said tab including a longitudinally inwardly recessed center portion; said display rack including a display board and an open cavity in said display board, said cavity having a first end and a second end, a resilient finger at said first end and at a said second end of said cavity, said fiber tube and said plastic end closure being received within said cavity, said resilient finger at said first end of said cavity projecting longitudinally into said recessed center portion of said tube at said first end of said tube, and said resilient finger at said second end of said cavity projecting longitudinally into said recessed center portion of said tab.

2. The combination as set forth in claim 1 wherein said closed end of said tube is of the same material as said tube.

3. The combination as set forth in claim 2 wherein said tube and said second end are of integral one-piece construction.

4. In combination, a paper fiber tube, a plastic end closure, and a display rack; said paper fiber tube being a longitudinally extending tube of cylindrical lateral cross sectional configuration and having an inner wall and an outer wall and a first end and a second end, said first end being closed, and said first end having an outer peripheral portion and a longitudinally inwardly recessed center portion spaced longitudinally inwardly from said outer peripheral portion; said plastic end closure being of one-piece construction and including a generally flat annular ring-like base, said base having a top wall and a bottom wall and a central opening, an annular skirt portion connected to said bottom wall of said base and extending longitudinally away from said base, said skirt portion being received within said second end of said tube, an annular rib connected to said top wall of said base and extending longitudinally away from said base in a direction opposite said skirt portion and radially outwardly beyond said skirt portion, said annular rib including a bottom wall abutting said second end of said tube and an outer wall aligned with said outer wall of said tube and an inner wall and a top wall, said rib being discontinuous and interrupted at a first location and at a second location radially opposite said first location, a tab movable between an open position and a closed position, said tab being hingedly connected to said base at said first location of said discontinuous rib, said tab being a disc shaped member disposed radially inwardly from said rib when said tab is in said closed position, said tab including an annular portion seated on said base when said tab is in said closed position, said tab including a longitudinally recessed center portion extending into said central opening of said base when said tab is in said closed position; said display rack including a display board, an open cavity in said display board, said cavity having a first end and a second end, a resilient finger at said first end and at said second end of said cavity projecting into said cavity, said fiber tube and said plastic end closure being received within said cavity, said fiber tube and said plastic end closure being received within said cavity, said resilient finger at said first end of said cavity projecting longitudinally into said recessed center portion at said first end of said tube, and said resilient finger at said second end of said cavity projecting longitudinally into said recessed center portion of said tube.

5. The combination as set forth in claim 4 wherein said tab includes a lifting portion, said lifting portion extends outwardly from said annular portion, and said lifting portion is disposed at said second location when said tab is in said closed position.

6. The combination as set forth in claim 4 wherein said closed end of said tube is of the same material as said tube, and said tube and said closed end are of integral one-piece construction.

7. The combination as set forth in claim 4 wherein said base includes a passage extending longitudinally therethrough, said passage is disposed radially outwardly from said central opening of said base and radially inwardly from said skirt portion, said tab includes a locking pin projecting from said annular portion of said tab in a direction toward said tube when said tab is in said closed position, and said locking pin is received in said passage when said tab is in said closed position.

8. The combination as set forth in claim 7 wherein said tab includes another locking pin projecting from said annular portion of said tab in a direction toward said tube when said tab is in said closed position, and said other locking pin is received in said central opening when said tab is in closed position.

9. A one-piece plastic end closure comprising a generally flat annular ring like base, said base having a top wall and a bottom wall and a central opening, an annular skirt portion connected to said bottom wall of said base and extending longitudinally away from said base, said skirt portion being adapted to be received within an open end of a fiber tube, an annular rib connected to said top wall of said base and extending longitudinally away from said base in a direction opposite a direction in which said skirt portion extends and radially outwardly beyond said skirt portion, said annular rib including a bottom wall adapted to abut the end of the fiber tube and an outer wall adapted to be aligned with the outer wall of the fiber tube and an inner wall and a top wall, said rib being discontinuous and interrupted at a first location and at a second location radially opposite said first location, a tab movable between an open position and a closed position, said tab being hingedly connected to said base at said first location of said discontinuous rib, said tab being a disc shaped member disposed radially inwardly from said rib when said tab is in said closed position, said tab including an annular portion seated on said base when said tab is in said closed position, said tab including a longitudinally recessed center portion extending longitudinally into said opening of said base when said tab is in said closed position.

10. A one-piece plastic end closure as set forth in claim 9 wherein said annular portion of said tab includes a top wall, and said top wall of said tab annular portion is substantially coplanar with said top wall of said rib when said tab is in said closed position.

11. A one-piece plastic end closure as set forth in claim 10 wherein said tab includes a lifting portion, said lifting portion extends radially outwardly from said annular portion, and said lifting portion is disposed at said second location when said tab is in said closed position.

12. A one-piece plastic end closure as set forth in claim 11 wherein said base includes a passage extending longitudinally therethrough, said passage is disposed radially outwardly from said central opening of said base and radially inwardly from said skirt portion, said tab includes a locking pin projecting from said annular portion of said tab in the same direction as the direction in which said skirt portion extends when said tab is in said closed position, and said locking pin is received in said passage when said tab is in said closed position.

* * * * *